United States Patent
Hovhannisian et al.

(10) Patent No.: US 10,329,953 B2
(45) Date of Patent: Jun. 25, 2019

(54) REAR BEARING SLEEVE FOR GAS TURBINE AUXILIARY POWER UNIT

(71) Applicant: United Technologies Corporation, Hartford, CT (US)

(72) Inventors: Ara J. Hovhannisian, Poway, CA (US); Christine Ingrid Schade, San Diego, CA (US); Walter Herfort, Oceanside, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 651 days.

(21) Appl. No.: 14/780,171

(22) PCT Filed: Mar. 27, 2014

(86) PCT No.: PCT/US2014/031995
§ 371 (c)(1),
(2) Date: Sep. 25, 2015

(87) PCT Pub. No.: WO2014/160851
PCT Pub. Date: Oct. 2, 2014

(65) Prior Publication Data
US 2016/0040554 A1 Feb. 11, 2016

Related U.S. Application Data
(60) Provisional application No. 61/806,147, filed on Mar. 28, 2013.

(51) Int. Cl.
*F16C 19/06* (2006.01)
*F01D 25/16* (2006.01)
(Continued)

(52) U.S. Cl.
CPC .......... *F01D 25/164* (2013.01); *F01D 25/18* (2013.01); *F16C 27/045* (2013.01);
(Continued)

(58) Field of Classification Search
CPC ............................. F01D 25/164; F16C 27/045
See application file for complete search history.

(56) References Cited

U.S. PATENT DOCUMENTS

| 4,527,912 | A | 7/1985 | Klusman |
| 7,329,048 | B2 * | 2/2008 | Klusman ............... F01D 25/125 384/99 |

(Continued)

FOREIGN PATENT DOCUMENTS

| DE | 102011007250 A1 | 10/2012 |
| EP | 1630357 A2 | 3/2006 |

(Continued)

OTHER PUBLICATIONS

DE102011007250 English Abstract.
(Continued)

*Primary Examiner* — Kayla McCaffrey
(74) *Attorney, Agent, or Firm* — Cantor Colburn LLP

(57) ABSTRACT

The presently disclosed embodiments utilize a rear bearing sleeve interposed between an inner surface of an exhaust housing of a gas turbine auxiliary power unit and the rear roller bearing supporting a turbine within the exhaust housing. In some embodiments, the rear bearing sleeve includes a lubricant supply channel formed in an outer surface thereof for receipt of a supply of lubricant, and at least one lubricant supply opening between the outer surface and an inner surface thereof, the inner surface of the bearing sleeve forming an outer race of the rear roller bearing. The at least one lubricant supply opening supplies the lubricant to a gap between the rear roller bearing and the rear bearing sleeve (Continued)

for formation of a squeeze film viscous damper therebetween.

15 Claims, 4 Drawing Sheets

(51) Int. Cl.
*F01D 25/18* (2006.01)
*F16C 33/66* (2006.01)
*F16C 27/04* (2006.01)
*F16C 19/26* (2006.01)
*F16C 35/077* (2006.01)

(52) U.S. Cl.
CPC ...... *F16C 33/6659* (2013.01); *F05D 2220/50* (2013.01); *F16C 19/26* (2013.01); *F16C 35/077* (2013.01); *F16C 2360/23* (2013.01)

(56) References Cited

U.S. PATENT DOCUMENTS

| | | |
|---|---|---|
| 2004/0037483 A1 | 2/2004 | Beauvais et al. |
| 2007/0157596 A1 | 7/2007 | Moniz |
| 2009/0263057 A1 | 10/2009 | Kanki et al. |
| 2009/0269185 A1 | 10/2009 | Spencer |
| 2011/0064340 A1* | 3/2011 | Duong .......... F16C 27/045 384/99 |

FOREIGN PATENT DOCUMENTS

| | | |
|---|---|---|
| GB | 2080888 A | 2/1982 |
| JP | H1162953 A | 3/1999 |

OTHER PUBLICATIONS

European Search Report Application No. EP 14 77 3550.
JPH1162953 English Abstract.
JPH1162953 English Machine Translation of Description and Claims.
DE102011007250 English Machine Translation of Description and Claims.
International Search Report for Application No. PCT/US2014/031995; dated Jul. 15, 2014.

* cited by examiner

REAR BEARING SLEEVE FOR GAS TURBINE AUXILIARY POWER UNIT

CROSS REFERENCE TO RELATED APPLICATION

This application claims the benefit of and incorporates by reference herein the disclosure of U.S. Ser. No. 61/806,147, filed Mar. 28, 2013.

TECHNICAL FIELD OF THE DISCLOSURE

The present disclosure is generally related to gas turbine engines and, more specifically, to a rear bearing sleeve for a gas turbine auxiliary power unit.

BACKGROUND OF THE DISCLOSURE

A gas turbine auxiliary power unit (APU) includes an exhaust housing that supports the turbine contained therein. The aft side of the turbine rotor is supported in the exhaust housing by a rear roller bearing, where the exhaust housing serves as the structural support of the rear roller bearing while providing a channel for hot gases exiting the turbine. In some circumstances, thermal and mechanical interactions between the rear roller bearing and the exhaust housing may cause wear and/or damage to an inner surface of the exhaust housing.

Therefore, improvements in the support of a turbine in of a gas turbine auxiliary power unit are still needed to minimize or prevent damage to the inner surface of the exhaust housing. The presently disclosed embodiments are directed to this need.

SUMMARY OF THE DISCLOSURE

The presently disclosed embodiments utilize a rear bearing sleeve interposed between an inner surface of an exhaust housing of a gas turbine auxiliary power unit and the rear bearing supporting a turbine within the exhaust housing. In some embodiments, the rear bearing is a roller bearing. In some embodiments, the rear bearing sleeve includes a lubricant supply channel formed in an outer surface thereof for receipt of a supply of lubricant, and at least one lubricant supply opening between the outer surface and an inner surface thereof; the inner surface of the bearing sleeve forming an outer race of the rear roller bearing. The at least one lubricant supply opening supplies the lubricant to a gap between the rear roller bearing and the rear bearing sleeve for formation of a squeeze film viscous damper therebetween.

In one embodiment, a gas turbine auxiliary power unit is disclosed, comprising: a turbine; an exhaust housing; a bearing disposed between the turbine and the exhaust housing; and a bearing sleeve disposed between the bearing and the exhaust housing; wherein the turbine is at least partially supported by the bearing and the bearing bears upon the bearing sleeve.

In another embodiment, a bearing sleeve is disclosed, comprising: an annular body including an inner surface and an outer surface; and at least one opening formed between the inner surface and the outer surface; and a channel formed in at least a portion of the outer surface, wherein at least one of the at least one openings communicates with the channel.

Other embodiments are also disclosed.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
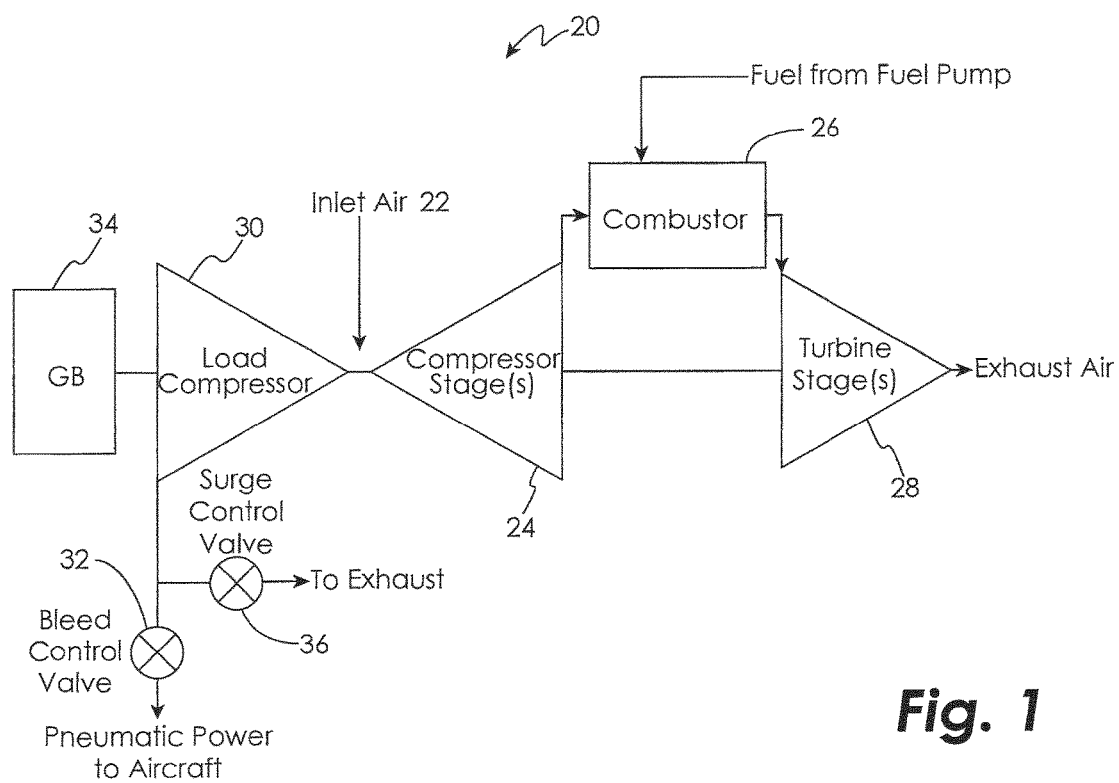
FIG. 1 is a schematic block diagram of a gas turbine auxiliary power unit in an embodiment.

FIG. 1 illustrates a gas turbine auxiliary power unit (APU), indicated generally at 20. APU 20 includes a source of inlet air 22, a compressor section 24 for pressurizing the air, a combustor 26 in which the compressed air is mixed with fuel and ignited for generating an annular stream of hot combustion gases, and a turbine section 28 for extracting energy from the combustion gases. A shaft-mounted load compressor 30 provides pneumatic power (through bleed control valve 32) for the aircraft in which the APU is mounted, while a gearbox 34 transfers power from the shaft of the APU to other accessories (not shown). Surge control valve 36 maintains stable, surge-free operation of the APU 20.

Figure 2:
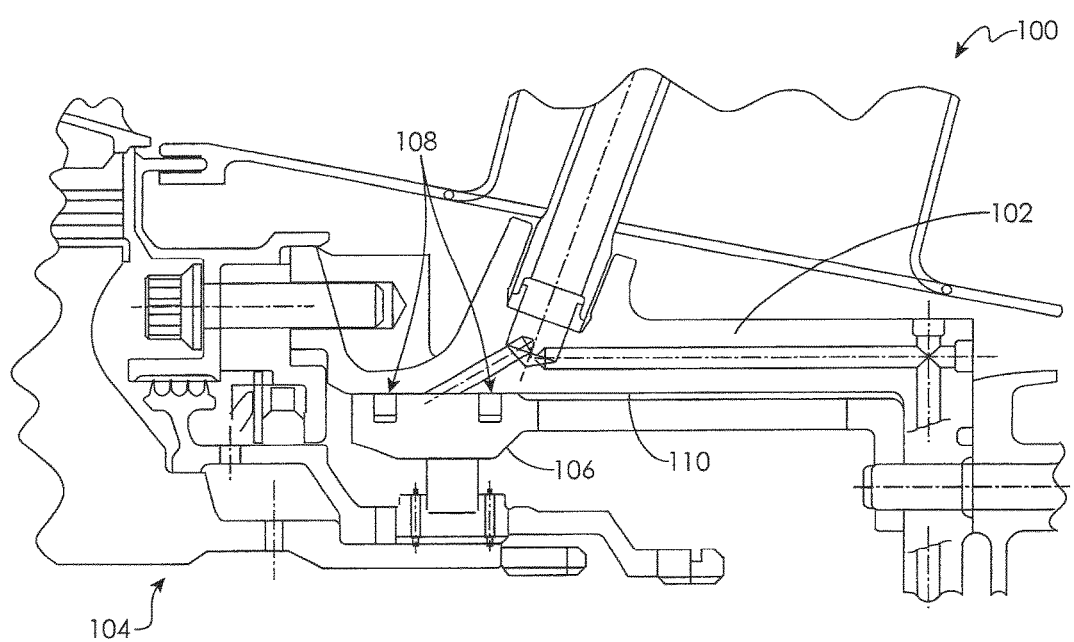
FIG. 2 is a schematic partial cross-sectional diagram of a gas turbine auxiliary power unit in an embodiment.

Referring now to FIG. 2, a portion of an APU in an embodiment is illustrated in partial cross-section and indicated generally at 100. The APU 100 includes an exhaust housing 102 that supports a turbine 104 contained therein. The turbine 104 is supported in the exhaust housing 102 by a rear roller bearing 106, where the exhaust housing 102 serves as a structural support of the rear roller bearing 106. One or more inner races 108 contain a plurality of roller elements (not shown) that bear on an inner surface 110 of the exhaust housing 102. A similar front roller bearing (not shown) supports the opposite end of the turbine 104.

Because rotation of the turbine 104 is induced by the flow of gases exiting the combustor (not shown), the turbine 104 and the exhaust housing 102 experience high operating temperatures. Therefore, the exhaust housing 102 is typically made from a high temperature resistance alloy.

In some circumstances, interaction between the rear roller bearing 106 and the exhaust housing 102 may cause wear and/or damage to the inner surface 110 of the exhaust housing 102. For example, radial forces imposed on the rear roller bearing 106, caused by vibration as the APU 100 cycles through various operating modes, may cause wear and/or damage to the inner surface 110 of the exhaust housing 102. Additionally, the rear roller bearing 106 normally bears only a portion of the load imposed by supporting the turbine 104 (the remaining portion being born by the front roller bearing). An imbalance of the turbine 104 may result in a majority of the load forces being transferred to the rear roller bearing 106, causing additional wear and/or damage to the inner surface 110 of the exhaust housing 102. In another example, in the case of a rotor seizure event (where the rotating portions of the APU 100 suddenly stop moving), large rotational forces are transferred to the rear roller bearing 106/exhaust housing 102 interface, causing additional wear and/or damage to the inner surface 110 of the exhaust housing 102.

When there is sufficient wear and/or damage to the inner surface 110 of the exhaust housing 102, the exhaust housing may be removed from the APU 100 and an attempt may be made to repair the exhaust housing 102. The alloys used to construct the exhaust housing 102 are difficult to repair, as the material requires heat treating after welding, which can cause a change in the shape of the exhaust housing 102 such that the repaired exhaust housing 102 cannot be reused. Even if the exhaust housing 102 can be repaired and reused, the repair operation is very costly and time consuming, increasing the length of time that the APU 100 is out of service.

Figure 3:
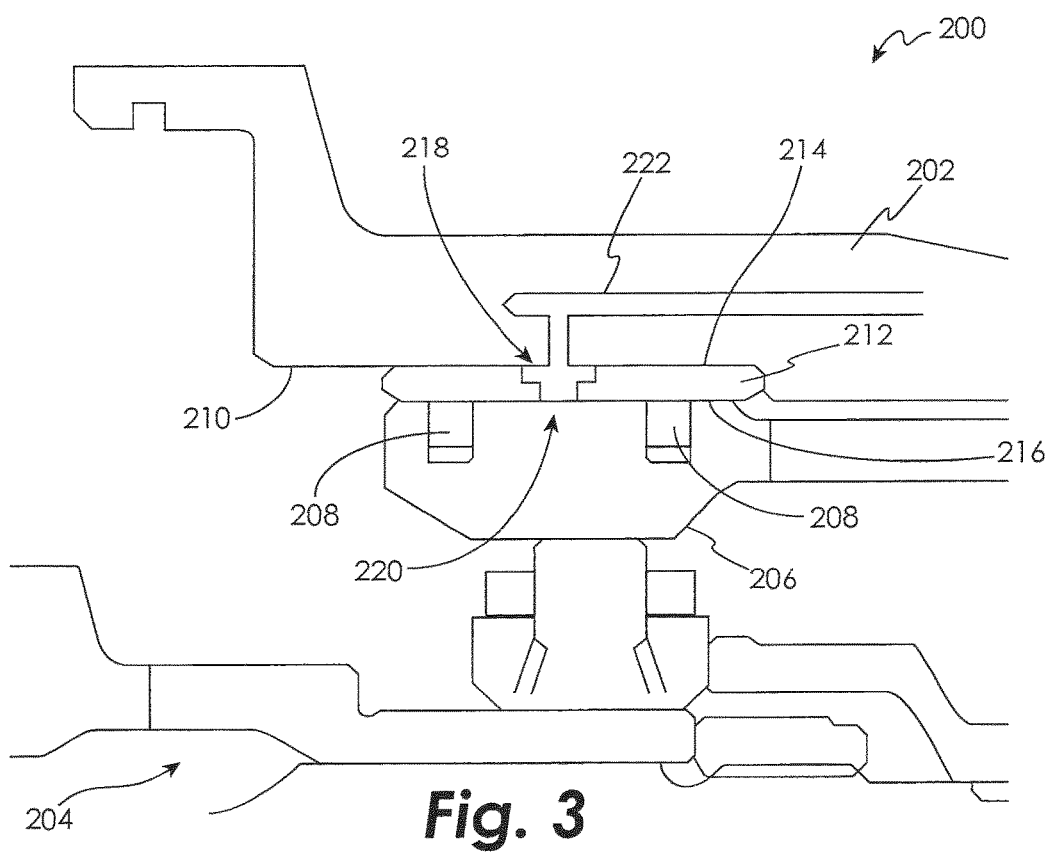
FIG. 3 is a schematic partial cross-sectional diagram of a gas turbine auxiliary power unit in an embodiment.
Figure 4:
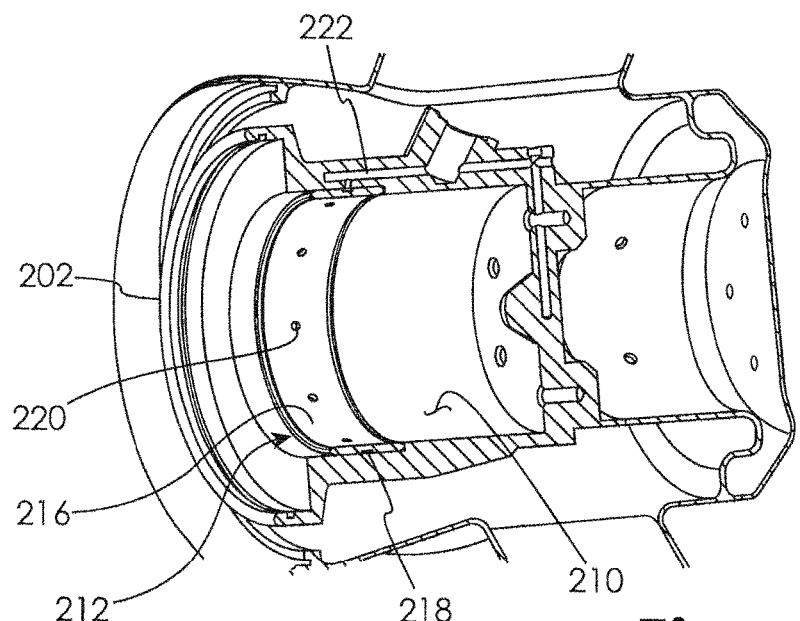
FIG. 4 is a schematic partial cross-sectional diagram of a gas turbine auxiliary power unit in an embodiment.
Figure 5:
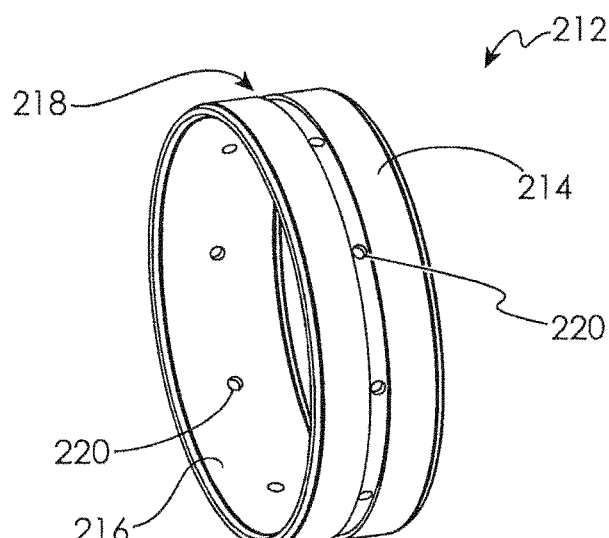
FIG. 5 is a perspective view of a bearing sleeve in an embodiment.

Referring now to FIGS. 3-5, a portion of an APU in an embodiment is illustrated in partial cross-section and indicated generally at 200. The APU 200 includes an exhaust housing 202 that supports a turbine 204 contained therein. The turbine 204 is supported in the exhaust housing 202 by a rear roller bearing 206, where the exhaust housing 202 serves as a structural support of the rear roller bearing 206. One or more inner races 208 contain a plurality of roller elements (not shown). A similar front roller bearing (not shown) supports the opposite end of the turbine 204.

A rear bearing sleeve 212 is disposed between the rear roller bearing 206 and the inner surface 210 of the exhaust housing 202. The rear bearing sleeve 212 may be made from any suitable material, such as a high temperature alloy or hardened steel, to name just two non-limiting examples. The rear bearing sleeve 212 includes an outer surface 214 and an inner surface 216. Inner surface 216 of the rear bearing sleeve 212 serves as an outer race of the rear roller bearing 206, rather than the inner surface 210 of the exhaust housing 202. The rear bearing sleeve 212 may include in some embodiments a lubricant supply channel 218 and one or more lubricant supply openings 220 formed between the outer surface 214 of the rear bearing sleeve 212 and the inner surface 216 of the rear bearing sleeve 212. One or more lubricant delivery lines 222 may be formed in exhaust housing 202 for delivery of lubricant to the lubricant supply channel 218.

In at least one embodiment, a gap is maintained between the roller bearing 206 and the inner surface 216 of the rear bearing sleeve 212, and this gap is supplied with lubricant from the lubricant delivery line 222. Lubricant flows from the lubricant delivery line 222 to the lubricant supply channel 218 and through the lubricant supply openings 220 to supply lubricant to the gap. This lubricant forms a squeeze film viscous damper to provide viscous damping between the rear roller bearing 206 and the inner surface 216 of the rear bearing sleeve 212.

In the event of wear and/or damage to the rear bearing sleeve 212, the relatively inexpensive rear bearing sleeve 212 may be replaced rather than repairing or replacing the relatively expensive exhaust housing 202. Because of the relative simplicity of replacing the rear bearing sleeve 212 versus repairing or replacing the exhaust housing 202, the APU 200 will be out of service for a shorter time. In some embodiments, the rear bearing sleeve 212 may be periodically replaced as part of a routine maintenance schedule.

It will be appreciated by those skilled in the art from the above disclosure that, while the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A gas turbine auxiliary power unit, comprising:
    a turbine;
    an exhaust housing of the auxiliary power unit;
    a bearing disposed between the turbine and the exhaust housing;
    a bearing sleeve disposed between the bearing and the exhaust housing, wherein the bearing sleeve serves as an outer race of the bearing and wherein a gap is maintained between an inner surface of the bearing sleeve and the bearing;
    a lubricant disposed within the gap; and
    wherein the turbine is at least partially supported by the bearing.

2. The gas turbine auxiliary power unit of claim 1, wherein the bearing comprises a roller bearing.

3. The gas turbine auxiliary power unit of claim 1, wherein the lubricant forms a squeeze film viscous damper between the bearing and the bearing sleeve.

4. The gas turbine auxiliary power unit of claim 1, wherein the bearing sleeve comprises a material including one of: a high temperature alloy and hardened steel.

5. The gas turbine auxiliary power unit of claim 1, wherein the bearing sleeve comprises:
    an outer surface; and
    at least one opening formed between the inner surface and the outer surface.

6. The gas turbine auxiliary power unit of claim 5, further comprising:
    a channel formed in at least a portion of the outer surface, wherein at least one of the at least one openings communicates with the channel.

7. The gas turbine auxiliary power unit of claim 6, further comprising:
    a lubricant delivery line formed in the exhaust housing, wherein the lubricant delivery line communicates with the channel and is configured to supply lubricant to the channel.

8. The gas turbine auxiliary power unit of claim 7, wherein:
    lubricant may flow from the channel, through the at least one opening and into the gap.

9. The gas turbine auxiliary power unit of claim 8, wherein the lubricant forms a squeeze film viscous damper between the bearing and the bearing sleeve.

10. A bearing sleeve, comprising:
    an annular body including an inner surface and an outer surface, wherein the bearing sleeve is an outer race of a bearing for use with a gas turbine auxiliary power unit;
    at least one opening formed between the inner surface and the outer surface; and
    a channel formed in at least a portion of the outer surface;
    wherein the at least one opening formed between the inner surface and the outer surface is in fluid communication with the channel.

11. The bearing sleeve of claim 10, wherein the bearing sleeve comprises a material including one of: a high temperature alloy and hardened steel.

12. The bearing sleeve of claim 10, further comprising:
    a lubricant delivery line disposed adjacent the annular body, wherein the lubricant delivery line communicates with the channel and supplies lubricant to the channel.

13. The bearing sleeve of claim 10, wherein the channel extends completely around the outer surface.

14. The bearing sleeve of claim 10, wherein the at least one opening comprises a plurality of openings.

15. The bearing sleeve of claim 14, wherein the plurality of openings are spaced equidistant from one another.

\* \* \* \* \*